(12) United States Patent
Muir et al.

(10) Patent No.: US 8,114,934 B2
(45) Date of Patent: Feb. 14, 2012

(54) COMPRESSED GASKETING MATERIAL

(75) Inventors: Matthew C. Muir, Fairport, NY (US);
Kenneth Hill, Newark, NJ (US); David J. Burgess, Clyde, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 45 days.

(21) Appl. No.: 12/446,566

(22) PCT Filed: Dec. 7, 2007

(86) PCT No.: PCT/IB2007/003826
§ 371 (c)(1),
(2), (4) Date: Mar. 9, 2010

(87) PCT Pub. No.: WO2008/068611
PCT Pub. Date: Jun. 12, 2008

(65) Prior Publication Data
US 2010/0197846 A1    Aug. 5, 2010

Related U.S. Application Data

(60) Provisional application No. 60/873,390, filed on Dec. 7, 2006.

(51) Int. Cl.
*C08K 9/04* (2006.01)
*C09C 1/42* (2006.01)

(52) U.S. Cl. .................... 524/445; 524/447

(58) Field of Classification Search ............ 524/445
See application file for complete search history.

(56) References Cited

U.S. PATENT DOCUMENTS

| | | | |
|---|---|---|---|
| 4,546,033 A * | 10/1985 | Tsuchimoto et al. | 442/65 |
| 4,668,724 A | 5/1987 | Harriett | |
| 4,859,526 A * | 8/1989 | Potepan et al. | 442/136 |
| 5,232,973 A * | 8/1993 | Sakashita et al. | 524/492 |
| 5,536,565 A | 7/1996 | Halout et al. | |

FOREIGN PATENT DOCUMENTS

| | | |
|---|---|---|
| EP | 0 050 906 | 5/1982 |
| EP | 0 326 926 | 8/1989 |
| EP | 0 461 901 | 12/1991 |
| JP | 2000265322 A * | 9/2000 |

OTHER PUBLICATIONS

Translation of JP2000-265322, Sep. 26, 2000.*
International Bureau *International Search Report and Written Opinion* Jun. 24, 2008.

* cited by examiner

*Primary Examiner* — Ling Choi
*Assistant Examiner* — Hui Chin
(74) *Attorney, Agent, or Firm* — Holland & Hart LLP

(57) ABSTRACT

A compressed sheet gasketing material is provided with a combination of high elastomer content and high swelling medium content. In one aspect, the swelling medium may include bentonite clay and may be provided a weight percentage that varies from 30 to 60%. In another aspect, a rubber content weight percentage that varies from 20 to 30% provides a relatively high compressibility. The compressed sheet gasketing material may further include one or more various fibers commonly used in high pressure sheet formulations.

6 Claims, 1 Drawing Sheet

COMPRESSED GASKETING MATERIAL

CROSS-REFERENCE TO RELATED APPLICATION

Figure 1:
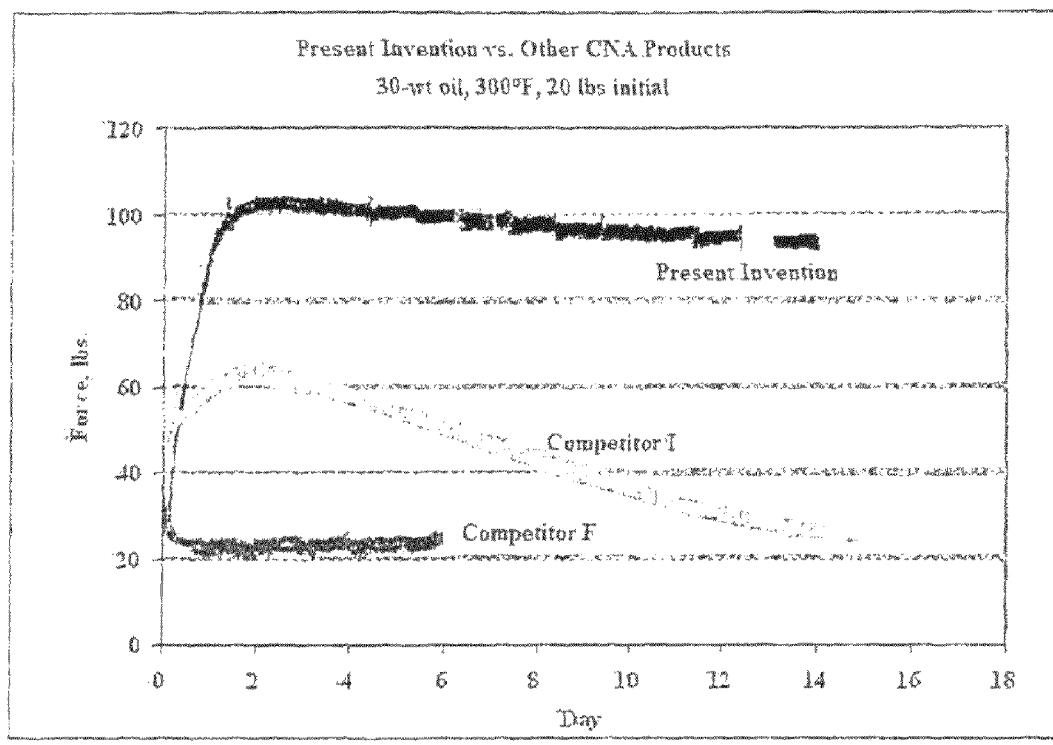

The invention claims priority from U.S. Provisional Patent Application No. 60/873,390 entitled IMPROVED COMPRESSED GASKETING MATERIAL, filed on Dec. 7, 2006, which Provisional patent application is hereby incorporated by reference in its entirety.

BACKGROUND

High-pressure sheets used as gasketing material have traditionally been prepared by mixing a base of fibers with a rubber binder and subjecting the resultant mixture to pressure and elevated temperature. The standard process for manufacturing high pressure sheets has involved mixing two separate component doughs, both of which have been essential components in making the high pressure sheet product. The main component, referred to as the body dough, has been mixed, for example, in a large drum mixer, although it has been known to be mixed in any of a variety of different mixer types. The components of this dough have typically included, for example, elastomers such as rubber materials, fibers, fillers such as clay, and small quantities of other materials, such as curing components, antioxidants and/or coloring agents which are known to those skilled in rubber compounding technology.

Typically, high-pressure sheets have been made on a two-roll sheeter machine, such as a Troester machine, which has a pair of rolls, one positioned above the other. The lower roll has been typically provided as a larger, heated roll while the upper roll has been provided as a smaller, normally unheated roll. To the conventional sheet on a machine of this type, a quantity of starter compound is first built up on the hot roll. A quantity of body compound is then added in the nip between the two rotating rolls. A high pressure sheet material is formed on the hot roll to the desired thickness and can then be removed and placed on a table or other support.

The high-pressure sheets have been used to form gaskets that may be placed between flanges, for example, of a conduit connection to provide a seal between the faces of the flanges. The typical gasketing material has been formed with a fairly small amount of rubber binder, on the order of 10-15% by weight, a quantity of clay which functions primarily as a filler, on the order of 20% or less, and a quantity of fibers to hold the material together. Compressed sheet gasketing materials have generally provided a secure seal against fluids, but only when used with flanges that are in good condition and when sufficient pressure has been applied to ensure a complete seal. A disadvantage of prior sheet gasketing materials has been the fact that a relatively large clamping force has been required to provide an adequate seal. However, such sheet gasketing materials have not been typically strong enough to withstand the required clamping pressure.

Sheet gasketing materials containing about 20% bentonite in the formulation have been known to swell in oils, thus providing a seal in applications such as pumps and engines. However, they have not been shown to provide an enhanced seal in water. In addition, while some sheet gasketing materials have provided an excellent seal when infused with a swelling medium such as oil or water, operations with frequent cycles of startup and shutdowns can been shown to inhibit the performance gains associated with highly swellable sheet formulations. Accordingly, there is a present need for an improved compressed sheet gasketing material which is particularly adapted to operate effectively in oil and water media, as well as when the process line is dry.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

It is a feature and advantage of the present technology to provide an improved compressed sheet gasketing material having exceptionally high swelling properties in oil and water media and is particularly adapted to operate effectively in oil and water media.

It is an additional object and feature of the subject technology to provide an improved compressed sheet gasketing material having high compressibility which also perform effectively when the process line is dry.

To achieve the stated and other features, advantages and objects, embodiments of the present technology provide an improved compressed sheet gasketing material utilizing a combination of high elastomer content and high swelling medium content, such as bentonite, to provide both high swellability, which gives an excellent seal when infused with the swelling medium, and high compressibility, which gives an excellent seal when the process line is dry. In one aspect of the technology, a sheet material is made with a high content of a component, such as bentonite clay, which swells both in water and in oil, and in another aspect, the sheet also has a high content of elastomer, which yields high compressibility for ease of sealing under low bolt load.

In order to maintain the high degree of swellability in oil and water, the content of the swelling medium component, such as the bentonite clay, can vary from 30-60%. In order to maintain the high compressibility, the rubber content can vary from 20-30%. With regard to the remaining components of the sheet gasketing material for embodiments of the technology, any fiber commonly used in high pressure sheet formulations, such as any manner of new or reprocessed polyamide, 100% para-aramid or a mixture including meta-aramid, graphite or carbon fiber, mineral fiber, polyacrylate, cellulosic, nylon, ceramic fiber, sepiolite, asbestos, or fiberglass, can be used.

Additional objects, advantages and novel features of the technology will be set forth in part in the description which follows, and in part will become more apparent to those skilled in the art upon examination of the following, or may be learned from practice of the technology.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Embodiments of the present technology provide an improved compressed sheet gasketing material, using a combination of high elastomer content and high swelling medium content. With respect to water service and some oil services, embodiments of the technology allow for swelling in water and/or oil in order to enhance the seal under relatively low bolt load as the flanges are clamped together. While bentonite clay, which swells very well in water and in oils, has been used in the past in relatively small proportions in sheet gasketing material, on the order of 20% or less by weight, embodiments of the present technology employ relatively large proportions of a swelling medium, such as bentonite clay, in excess of 20% and preferably in the range of 45% by weight. In one aspect, the large proportion of swelling medium within the sheet gasketing material provides a force against the adjacent flange faces, thus providing a tighter seal.

While compressed sheet gasketing material having a high content of swelling medium, such as bentonite clay, has been found to perform far better than prior sheet gasketing materials having relatively small proportions of swelling medium, under certain circumstances, such as cyclic loading of water and/or oils, the high swelling medium content solution for an embodiment of the technology has been typically less robust. In this regard, it has been determined that when the loading of water and/or oils is reduced or eliminated, the swelling of the gasketing material is reduced. When the system is subsequently charged with water and/or oil, the gasketing material is not initially in its swelled state and consequently does not initially provide a strong force against the flange faces, which is associated with a tighter seal. Accordingly, in an application such as water service or power generation in which it may be necessary to bleed the system dry on a periodic basis, such as a daily or weekly basis, there is a period of time after the system is recharged during which potential leaks can occur before the gasketing material fully swells to conform to the flanges. In order to improve the performance of the sheet gasketing material under such circumstances, embodiments of the technology may incorporate relatively large proportions of rubber in the sheet gasketing formulation to improve the compressibility of the gasketing material, thereby achieving an adequate seal even under low load conditions, such as circumstances in which the oil and/or water medium does not charge the system.

Table I illustrates an example of proportions of the components, including, bentonite as the swelling medium component and natural rubber and styrene-butadiene rubber as the elastomer components for the improved compressed gasketing material for embodiments of the technology.

TABLE I

| Component: | Weight Percent |
|---|---|
| Natural Rubber | 5.0% |
| Styrene-Butadiene Rubber | 20.1% |
| Polyamide Fiber | 14.5% |
| Silica Hydrate | 13.6% |
| Bentonite Clay | 45.3% |
| Antioxidant | 0.2% |
| Zinc Oxide (curative) | 0.7% |
| Sulfur | 0.4% |
| Curing Accelerator | 0.2% |

While examples have been given for a specific proportion of bentonite as the swelling medium and natural rubber and styrene-butadiene rubber as the elastomer, it is to be understood that the bentonite clay content for embodiments of the technology can vary from approximately 30-60% while maintaining a high degree of swellability in oil and/or water, and the elastomer content can vary from 20-30%. It is also to be understood that although a preferred embodiment uses bentonite as the swelling medium, any other suitable swelling agent, such as other clays or similar materials including montmorillonite, can be used as well. It is to be further understood that the gasketing material for embodiments of the technology can include any fiber commonly used in high pressure sheet formulations, such as new or reprocessed polyamide, 100% para-aramid or a mixture including meta-aramid, graphite or carbon fiber, mineral fiber, polyacrylate, cellulosic, nylon, ceramic fiber, sepiolite, asbestos, or fiberglass.

Table II illustrates an example of test results of a preferred formulation compared to that of two gasketing products. The bentonite clay causes a significant improvement in the swelling behavior of the preferred embodiment of the technology when compared to two standard sheet gasketing products.

TABLE II

| | ASTM F-146, Distilled Water Thickness Change, % |
|---|---|
| Preferred Embodiment | 29.5 |
| Product "A" | 2.6 |
| Product "B" | 13.3 |

FIG. 1 shows the behavior of a sheet gasketing material made according to the current technology compared with two commercial products. In the experiment, a gasketing material is placed between two smooth flanges at 20 pounds of pressure. The system is then subjected to immersion in a common oil at 300° F., and the force on the flanges is measured as a function of time. The gasketing material described in the technology swelled in the oil, which caused a marked improvement in the sealing force. The improvement in the sealing force reached a level of over 100 pounds, compared to maximum levels of 65 and 25 pounds in the other two cases; the sealing force for the preferred embodiment maintained a level of over 90 pounds over two weeks, while the competitors' products faded to under 30 pounds over the same period.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A compressed sheet gasketing material having a body, the body comprising:
    a swelling medium from about 45 to 60% by weight of montmorillonite clay;
    an elastomer that includes about 5% by weight of natural rubber and from about 20 to 30% by weight of styrene-butadiene rubber; and
    a fiber base.

2. The compressed sheet gasketing material of claim 1 wherein said swelling medium is comprised of bentonite clay.

3. The compressed sheet gasketing material of claim 1 wherein said fiber is comprised of a reprocessed polyamide.

4. The compressed sheet gasketing material of claim 1 wherein said fiber is comprised of a para-aramid.

5. A compressed sheet gasketing material having a body, the body comprising: a swelling medium from about 45 to 60% by weight of montmorillonite clay; an elastomer from about 20 to 30% by weight; the elastomer including natural rubber and styrene-butadiene rubber; and a fiber base that is comprised of one or more materials selected from the group consisting of a meta-aramid, graphite, mineral fiber, polyacrylate, nylon, ceramic fiber, and sepiolite.

6. The compressed sheet gasketing material of claim 1 wherein said elastomer is comprised of nitrile rubber.

* * * * *